United States Patent [19]
Dockwiller, III

[11] Patent Number: 5,340,076
[45] Date of Patent: Aug. 23, 1994

[54] COMPUTER KEYBOARD SUPPORT STAND

[76] Inventor: Joseph F. Dockwiller, III, 124 Meyers Rd., Liverpool, N.Y. 13088

[21] Appl. No.: 48,315

[22] Filed: Apr. 19, 1993

[51] Int. Cl.$^5$ .............................................. A47G 29/00
[52] U.S. Cl. ...................................... 248/371; 108/8; 248/923; 248/924
[58] Field of Search ............... 248/371, 393, 395, 124, 248/176, 146, 917, 918, 919, 920, 921, 922, 923, 924; 108/1, 8, 10

[56] References Cited
U.S. PATENT DOCUMENTS

| | | | |
|---|---|---|---|
| 1,652,774 | 12/1927 | Fraser et al. | 108/1 X |
| 4,681,042 | 7/1987 | Roberts | 108/8 X |
| 4,880,300 | 11/1989 | Payner et al. | 248/918 X |
| 5,240,215 | 8/1993 | Moore | 108/10 X |

*Primary Examiner*—Ramon O. Ramirez
*Attorney, Agent, or Firm*—E. Michael Combs

[57] ABSTRACT

A support stand includes a base plate having first and second support plates, having respective first and second slots for adjustably mounting respective first and second mounting plates, that in turn include respective first and second top walls that are coplanar with a bridge plate extending orthogonally between the mounting plates, with the bridge plate and the first and second top walls arranged to position a keyboard assembly in an adjustable relationship relative to the base plate.

3 Claims, 3 Drawing Sheets

COMPUTER KEYBOARD SUPPORT STAND

BACKGROUND OF THE INVENTION

1. Field of the Invention

The field of invention relates to computer support structure, and more particularly pertains to a new and improved computer keyboard support stand wherein the same is arranged for the adjustable mounting of a keyboard assembly relative to a work station.

2. Description of the Prior Art

In various computer use environments, orientation of the keyboard structure is significant in the efficient and effective use of such a terminal arrangement. Particularly when computer aided drafting programs are employed, displacement of the keyboard relative to an underlying support table is desired. The instant invention attempts to overcome deficiencies of the prior art by providing for a keyboard support stand arranged to accommodate and position a computer keyboard relative to an underlying support and in this respect, the present invention substantially fulfills this need.

Prior art patent structure has heretofore failed to provide this adjustability, wherein U.S. Pat. No. 4,988,150 is indicative of prior art structure to this extent.

SUMMARY OF THE INVENTION

In view of the foregoing disadvantages inherent in the known types of keyboard support stands now present in the prior art, the present invention provides a computer keyboard support stand wherein the same is arranged to permit the spacing and vertical adjustment of a computer keyboard relative to an underlying base plate and in this respect, the present invention substantially fulfills this need. As such, the general purpose of the present invention, which will be described subsequently in greater detail, is to provide a new and improved computer keyboard support stand which has all the advantages of the prior art keyboard support stands and none of the disadvantages.

To attain this, the present invention provides a support stand including a base plate having first and second support plates, having respective first and second slots for adjustably mounting respective first and second mounting plates, that in turn include respective first and second top walls that are coplanar with a bridge plate extending orthogonally between the mounting plates, with the bridge plate and the first and second top walls arranged to position a keyboard assembly in an adjustable relationship relative to the base plate.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved computer keyboard support stand which has all the advantages of the prior art keyboard support stands and none of the disadvantages.

It is another object of the present invention to provide a new and improved computer keyboard support stand which may be easily and efficiently manufactured and marketed.

It is a further object of the present invention to provide a new and improved computer keyboard support stand which is of a durable and reliable construction.

An even further object of the present invention is to provide a new and improved computer keyboard support stand which is susceptible of a low cost of manufacture with regard to both materials and labor, and which accordingly is then susceptible of low prices of sale to the consuming public, thereby making such computer keyboard support stands economically available to the buying public.

Still yet another object of the present invention is to provide a new and improved computer keyboard support stand which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
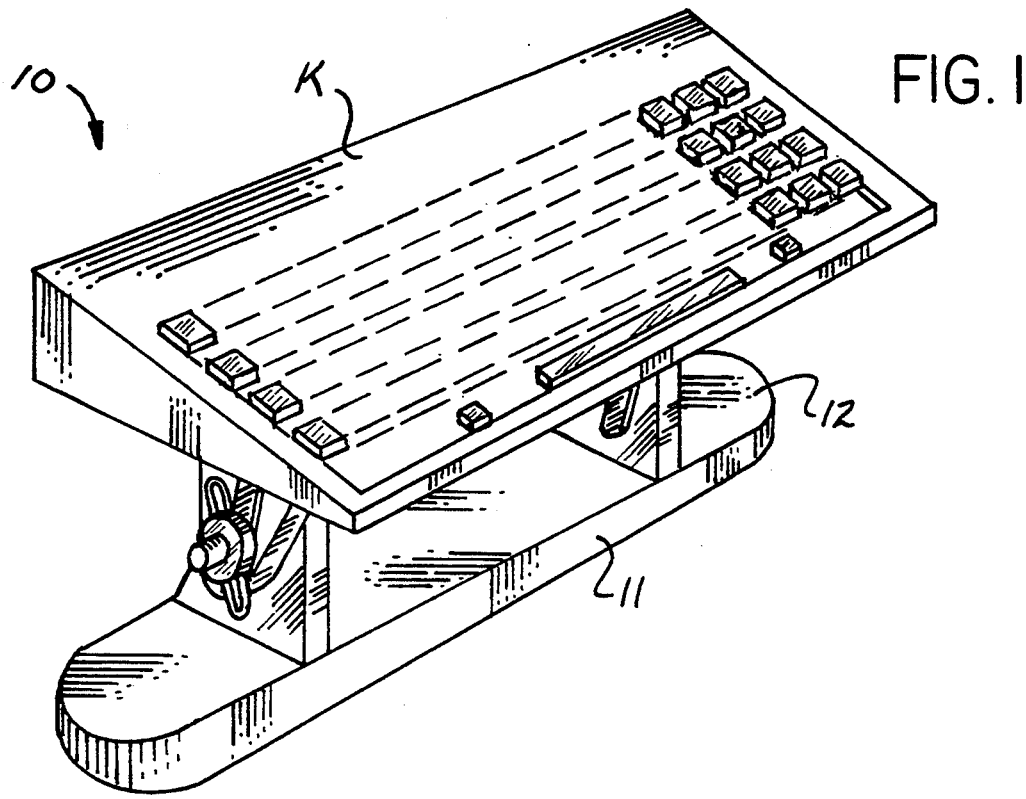
FIG. 1 is an isometric illustration of the invention mounting a keyboard member thereon.

With reference now to the drawings, and in particular to FIGS. 1 to 7 thereof, a new and improved computer keyboard support stand embodying the principles and concepts of the present invention and generally designated by the reference numeral 10 will be described.

Figure 2:
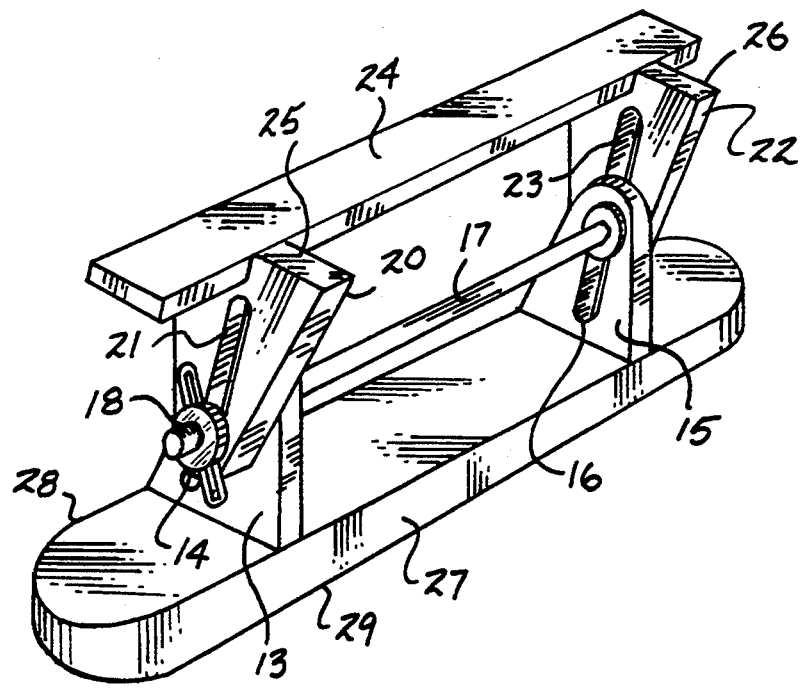
FIG. 2 is an isometric illustration of the support stand structure.
Figure 3:
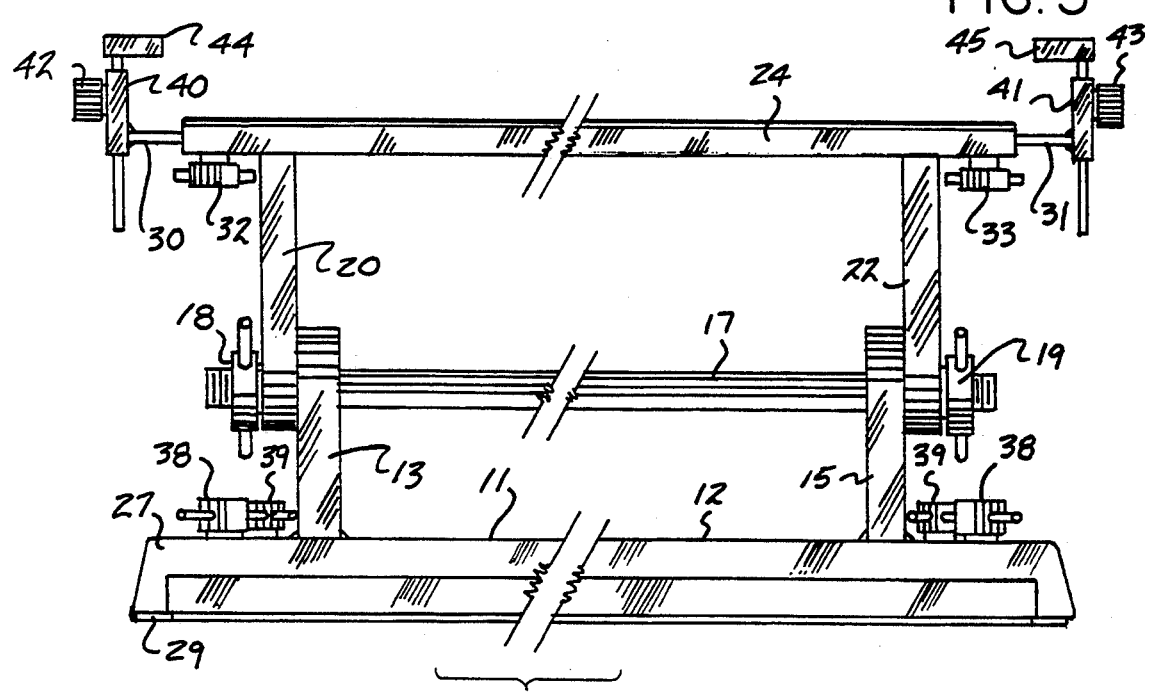
FIG. 3 is an orthographic elevational view of the keyboard support stand structure.
Figure 4:
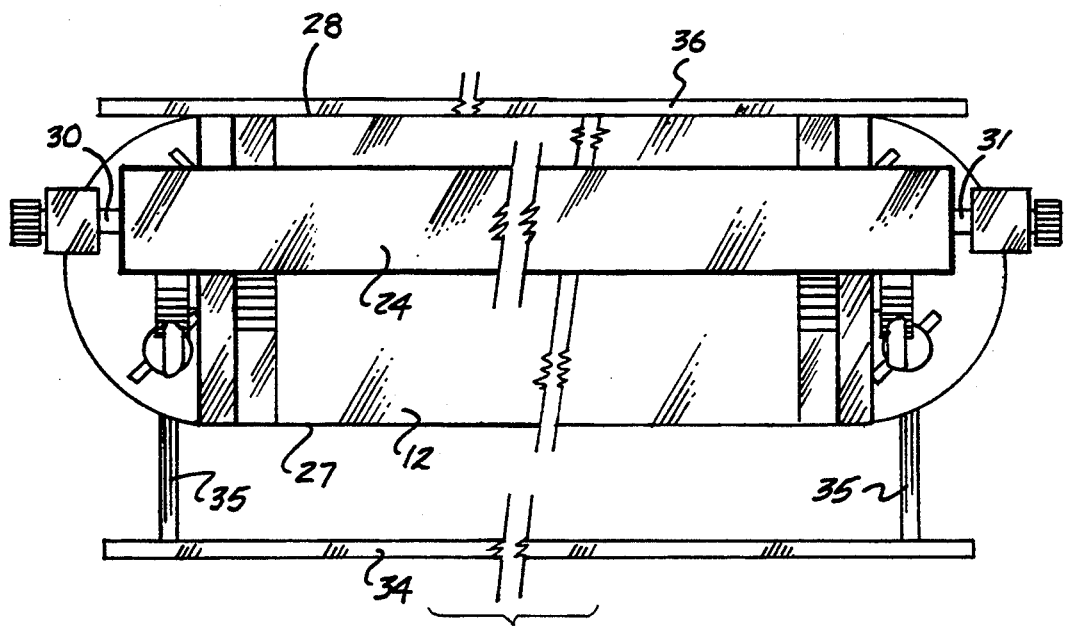
FIG. 4 is an orthographic top view of the keyboard support stand including foot plate members arranged to afford stability to the organization in use.
Figure 5:
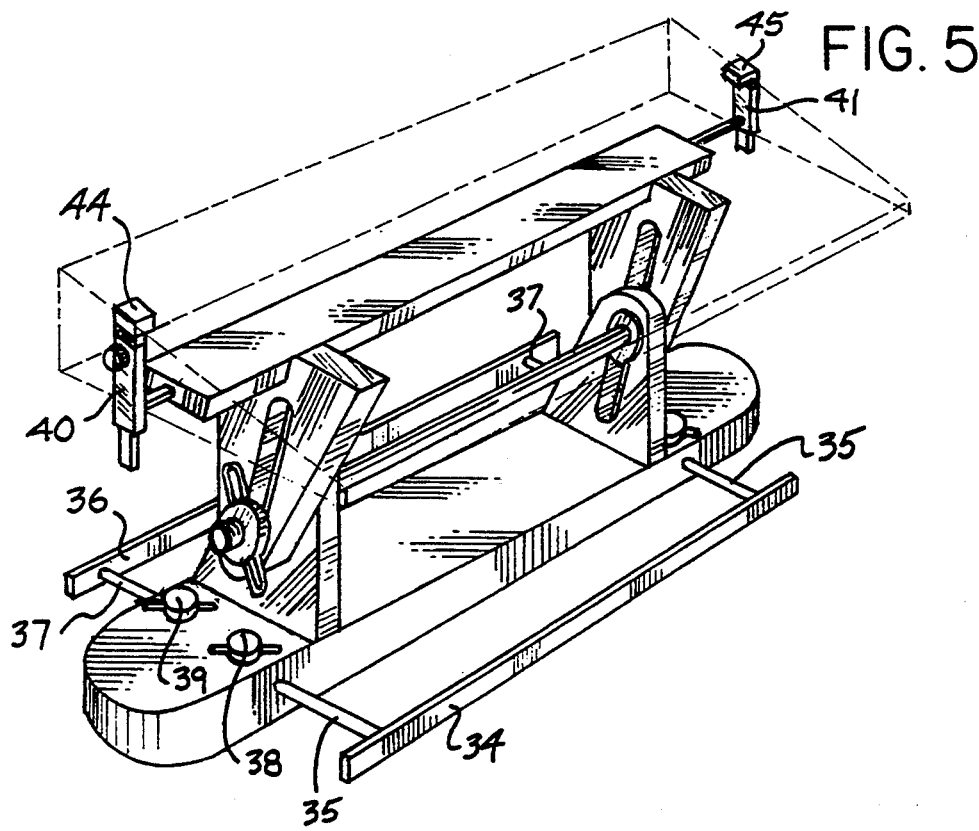
FIG. 5 is an isometric illustration of the invention and the base plate and keyboard fastener structure.
Figure 6:
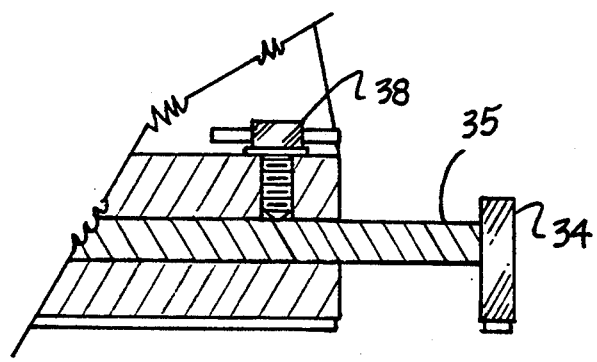
FIG. 6 is an orthographic partial view indicating the adjustment of a foot plate structure.
Figure 7:
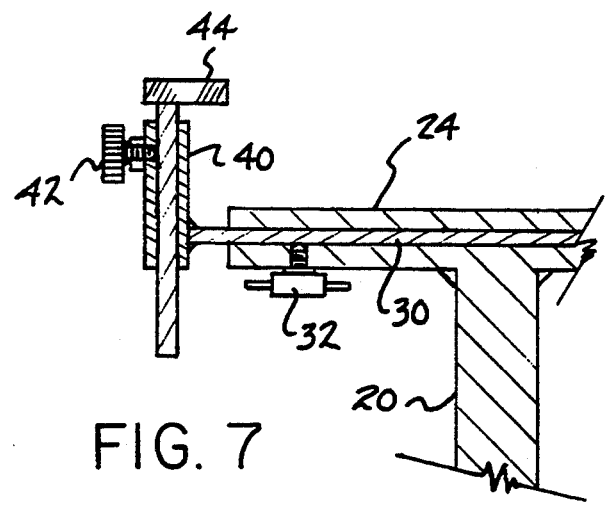
FIG. 7 is an orthographic cross-sectional partial view of a clamp bracket structure employed to secure the keyboard relative to the support stand.

More specifically, the computer keyboard support stand 10 of the invention essentially comprises a base plate 11, having a plate top wall 12, as well as plate first and second sides 27 and 28, and a base plate bottom wall 29. First and second support plates 13 and 15 orthogonally are mounted to the base plate 11 and parallel to one another, as illustrated in FIG. 2, having respective first and second support plate slots 14 and 16 that are arranged in a parallel coextensive relationship. A support axle 17 is orthogonally received through the first and second support plate 13 and 15 and the first and second support plate slots 14 and 16 that are further orthogonally directed through first and second mounting plate slots 21 and 23 of respective first and second mounting plates 20 and 22 that are arranged in a parallel coextensive relationship relative to one another. First and second fasteners 18 and 19 mounted to opposed first and second ends of the support axle 17 are arranged to angularly affix the first and second mounting plates 20 and 22 to the first and second support plates 13 and 15. First and second mounting plates 20 and 22 includes respective first and second mounting plate top walls 25 and 26 orthogonally and fixedly mounting a bridge plate 24 therebetween coplanar with the first and second mounting plate top walls 25 and 26, with the first and second mounting plate top walls 25 and 26 projecting orthogonally beyond the bridge plate 24 to provide a supporting surface of the first and second plate top walls 25 and 26 and the bridge plate 24 to support the keyboard "K", as indicated in FIG. 1. The base plate first and second sides 27 and 28 are arranged to include respective first and second foot plates 34 and 36 oriented in a slidable extensible relationship relative to the first and second sides 27 and 28, wherein the first and second foot plates 34 and 36 have respective first and second slide rods 35 and 37 that are orthogonally received slidably within the respective first and second sides 27 and 28 in a telescoping relationship relative to the first and second sides by respective first and second rod fasteners 38 and 39, in a manner as indicated in FIGS. 4-6. The first and second foot plates 34 and 36 when in an extended orientation, as indicated in FIG. 5 for example, provide enhanced stability to the organization in use mounting the keyboard "K". The slide bars 30 and 31 telescopingly received within the first and second ends of the bridge plate 24 are mounted and secured relative to the bridge plate 24 by respective first and second slide bar fasteners 32 and 33 orthogonally directed into the bridge plate intersecting the respective first and second slide bars 30 and 31. The first and second slide bars 30 and 31 orthogonally and fixedly mount respective first and second head bosses 40 and 41, that in turn slidably receive first and second L-shaped clamp brackets 44 and 45 by respective first and second boss fasteners 42 and 43. In this manner, the first and second clamp brackets 44 and 45 are arranged to secure the keyboard "K", in a manner as indicated in FIG. 5.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A computer keyboard support stand, comprising,
   a base plate, the base plate including a base plate top wall, a base plate bottom wall, a base plate first side wall, and a base plate second side wall, with the base plate top wall having respective first and second support plates fixedly and orthogonally mounted relative to the base plate top wall, with the first and second support plates arranged in a parallel coextensive relationship, and having respective first and second support plate slots arranged in a parallel coextensive relationship, and
   a support axle orthogonally directed through the first and second support slots, and
   a first and second mounting plate mounted in pivotal adjacency to the respective first and second support plate, with the first mounting plate having a first mounting plate slot, and the second mounting plate having a second mounting plate slot, with the first mounting plate slot and the second mounting plate slot orthogonally receiving the support axle therethrough, and the support axle including first and second fasteners secured to respective axle first and second ends for securing in a predetermined angular orientation the first and second mounting plates relative to the first and second support plates, with the first mounting plate including a first mounting plate top wall, the second mounting plate including a second mounting plate top wall, and
   a bridge plate orthogonally and fixedly mounted extending between the first mounting plate top wall and the second mounting plate top wall coplanar with the first mounting plate top wall and the second mounting top wall, wherein the bridge plate and the first mounting plate top wall and the second mounting plate top wall are arranged to accommodate a keyboard member thereon.

2. A support stand as set forth in claim 1 including a first foot plate having first slide rods that are slidably and orthogonally received into the base plate through the base plate first side wall, and a second foot plate having second foot plate slide rods that are orthogonally and slidably received into the base plate second side wall, wherein the first foot plate and the second foot plate are arranged to impart stability to the base plate, with first rod fasteners directed into the base plate top wall for engagement with said first foot plate slide rods, and second rod fasteners directed into the base plate top wall arranged for engagement with the second foot plate slide rods to permit affixing of the first foot plate and the second foot plate relative to the base plate first side wall and the base plate second side wall.

3. A support stand as set forth in claim 2 wherein the bridge plate includes a bridge plate first end and a bridge plate second end, with a first slide rod slidably received into the bridge plate first end, and a second slide rod received into the bridge plate second end, and a first rod fastener directed into the bridge plate arranged for securing the first slide rod relative to the bridge plate, and a second slide rod fastener directed into the bridge plate for securing the second slide rod relative to the bridge plate, the first slide rod having a first head boss orthogonally and fixedly mounted to the first slide rod, and a second head boss fixedly and orthogonally mounted to the second slide rod in an orthogonal relationship, with the first head boss including a first L-shaped clamp bracket slidably received within the first head boss, and a second L-shaped clamp bracket slidably received within the second head boss, and a first boss fastener securing the first clamp bracket relative to the first head boss and the second boss fastener securing the second clamp bracket to the second head boss, wherein the first clamp bracket and the second clamp bracket project above the bridge plate for securing said keyboard onto said bridge plate.

* * * * *